(12) United States Patent
Suzuki et al.

(10) Patent No.: US 8,574,127 B2
(45) Date of Patent: Nov. 5, 2013

(54) VEHICLE ENGINE CONTROL DEVICE

(75) Inventors: Ryo Suzuki, Toyota (JP); Akiyoshi Negishi, Aichi (JP); Shinichi Takeuchi, Nisshin (JP); Takeshi Kaino, Nisshin (JP); Katsuya Kobayashi, Okazaki (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/818,004

(22) PCT Filed: Aug. 20, 2010

(86) PCT No.: PCT/JP2010/064079
§ 371 (c)(1),
(2), (4) Date: Apr. 18, 2013

(87) PCT Pub. No.: WO2012/023206
PCT Pub. Date: Feb. 23, 2012

(65) Prior Publication Data
US 2013/0196820 A1  Aug. 1, 2013

(51) Int. Cl.
*B60W 10/02* (2006.01)
*B60W 10/04* (2006.01)

(52) U.S. Cl.
USPC ......................................................... 477/181

(58) Field of Classification Search
USPC .......................... 477/181, 166, 107, 174, 180
See application file for complete search history.

(56) References Cited

U.S. PATENT DOCUMENTS

| | | | |
|---|---|---|---|
| 6,352,491 B2 * | 3/2002 | Mashiki et al. | 477/107 |
| 2003/0171187 A1 * | 9/2003 | Aoki et al. | 477/107 |
| 2005/0124460 A1 | 6/2005 | Iriyama | |
| 2013/0053217 A1 * | 2/2013 | Tanaka et al. | 477/174 |

FOREIGN PATENT DOCUMENTS

| | | |
|---|---|---|
| JP | 10 318288 | 12/1998 |
| JP | 11 141356 | 5/1999 |
| JP | 2005 163760 | 6/2005 |
| JP | 2005 164046 | 6/2005 |

OTHER PUBLICATIONS

International Search Report Issued Oct. 5, 2010 in PCT/JP10/64079 Filed Aug. 20, 2010.

* cited by examiner

*Primary Examiner* — Justin Holmes
(74) *Attorney, Agent, or Firm* — Oblon, Spivak, McClelland, Maier & Neustadt, L.L.P.

(57) ABSTRACT

A vehicle engine control device stopping fuel injection if a predetermined fuel cut condition is satisfied, is provided, during running with the fuel injection stopped, when inertia of a power transmission system rotating with the engine has a smaller rate of inertia of the power transmission system acting on rotation of an output shaft of the engine, the fuel injection being started at a lower engine rotation speed as compared to the case of a larger rate of inertia of the power transmission system acting on rotation of the output shaft of the engine, a clutch capable of connecting and interrupting power transmission between the engine and the power transmission system being interposed between the engine and the power transmission system, a rate of inertia of the power transmission system acting on rotation of the output shaft of the engine being configured to decrease as a clutch stroke of the clutch that is an operation amount of a clutch pedal increases, and an engine rotation speed for starting the fuel injection being set to a lower value as the clutch stroke increases.

2 Claims, 5 Drawing Sheets

VEHICLE ENGINE CONTROL DEVICE

TECHNICAL FIELD

The present invention relates to a vehicle engine control device and particularly to fuel cut of an engine.

BACKGROUND ART

So-called fuel cut has conventionally been executed that achieves improvement of fuel efficiency by temporarily stopping fuel injection to an engine during deceleration running of a vehicle. For example, one example is an engine fuel supply control device of Patent Document 1. In the technique disclosed in Patent Document 1, if a condition for stopping fuel injection is satisfied in a vehicle including a manual transmission (manual transmission) at the time of shift of the manual transmission, the fuel injection is not immediately stopped after the satisfaction of the condition, and a predetermined delay time is set so as to stop the fuel injection after waiting for the delay time to pass and, particularly, the delay time is set shorter at the time of upshift as compared to the time of downshift. If the delay time is set as described above, since the fuel injection is promptly stopped at the time of upshift and an engine rotation speed is quickly reduced, the engine rotation speed is rapidly adjusted at the time of upshift and a shift can promptly be achieved. Since the fuel injection is continued at the time of downshift as compared to the time of upshift, a reduction of the engine rotation speed is suppressed and, therefore, the engine rotation speed is rapidly adjusted at the time of downshift and a shift can promptly be achieved.

PRIOR ART DOCUMENT

Patent Document

Patent Document 1: Japanese Laid-Open Patent Publication No. 2005-163760

SUMMARY OF THE INVENTION

Problem to Be Solved by the Invention

With regard to the fuel cut temporarily stopping fuel injection to an engine, a fuel cut recovery rotation speed for resuming the fuel injection to the engine is preliminarily defined and, when an engine rotation speed is reduced to the fuel cut recovery rotation speed, the fuel injection is performed again to recover the engine. Although a lower fuel cut recovery rotation speed makes a time of execution of fuel cut longer and improves fuel efficiency, this rotation number is set to a rotation speed enabling an engine recovery at the time of fuel injection in consideration of a load applied to the engine. In a manual transmission as described in Patent Document 1, the fuel cut recovery rotation speed is obtained based on an engaged state of a clutch selectively interrupting power transmission between a power transmission system including the manual transmission and an engine. If the fuel cut recovery rotation speed is obtained in the engaged state of the clutch in this way, since the connection between the engine and the power transmission system makes a load applied to the engine greater, the fuel cut recovery rotation speed is set to a higher value. Therefore, a time of execution of fuel cut is problematically shortened, resulting in wasteful fuel consumption. Since the problem is not known, no means for solving the problem is described in Patent Document 1.

The present invention was conceived in view of the situations and it is therefore an object of the present invention to provide a vehicle engine control device that executes so-called fuel cut for stopping fuel injection if a predetermined fuel cut condition is satisfied and that can improve fuel efficiency by extending a stop time of the fuel injection.

Means for Solving the Problems

To achieve the object, the present invention provides (a) a vehicle engine control device stopping fuel injection if a predetermined fuel cut condition is satisfied, wherein (b) during running with the fuel injection stopped, when inertia of a power transmission system rotating with the engine has a smaller rate of inertia of the power transmission system acting on rotation of an output shaft of the engine, the fuel injection is started at a lower engine rotation speed as compared to the case of a larger inertia of the power transmission system acting on rotation of the output shaft of the engine, (c) a clutch ca able of connecting and interrupting power transmission between the engine and the power transmission system is interposed between the engine and the power transmission system, wherein, (d) a rate of inertia of the power transmission system acting on rotation of the output shaft of the engine is configured to decrease as a clutch stroke of the clutch that is an operation amount of a clutch pedal increases, and wherein (e) an engine rotation speed for starting the fuel injection is set to a lower value as the clutch stroke increases.

The Effects of the Invention

Consequently, when inertia of a power transmission system rotating with the engine has a smaller rate of inertia of the power transmission system acting on rotation of an output shaft of the engine, the fuel injection is started at a lower engine rotation speed as compared to the case of a larger rate of inertia of the power transmission system acting on rotation of the output shaft of the engine. In the case of a smaller rate of inertia of the power transmission system acting on the rotation of the output shaft of the engine, a load acting on the engine is smaller as compared to the case of a larger rate of inertia of the power transmission system and, therefore, the engine can be started, i.e., operation of the engine can be recovered, even if fuel injection is started at a lower rotation speed as compared to the case of a larger rate of inertia of the power transmission system. Therefore, in the case of a smaller rate of inertia of the power transmission system acting on the rotation of the output shaft of the engine, even if fuel injection is started at a lower rotation speed as compared to the case of a larger rate of inertia of the power transmission system, startability of the engine is ensured and, since a time of stopping fuel injection is extended, fuel efficiency can be improved. An increase in the clutch stroke reduces a rate of the power transmission system acting on the rotation of the output shaft of the engine and therefore reduces a load applied to the engine. Although an increase in the clutch stroke reduces the engine rotation speed for starting fuel injection, since a load applied to the engine is also reduced, even if fuel injection is started from a state of a lower rotation speed of the engine, operation of the engine can be recovered and the engine startability is ensured. Therefore, even if the engine rotation speed for starting fuel injection is set to a lower value as the clutch stroke increases, the startability of the engine is ensured and, since a time of stopping fuel injection is extended, fuel efficiency can be improved.

Preferably, the engine rotation speed for starting the fuel injection is set to a lower value as a clutch operation speed becomes higher. Consequently, for example, when the clutch operation speed is larger, the clutch is predicted to be promptly released and, therefore, even if the rotation speed for starting fuel injection of the engine is lowered, the operation of the engine can be recovered as the release of the clutch reduces a load applied to the engine. Since a time of stopping fuel injection is extended, fuel efficiency can be improved.

Preferably, the predetermined fuel cut condition corresponds to the case that during vehicle deceleration running, an engine rotation speed is higher than a preset rotation speed for starting fuel injection.

Preferably, the inertia of the power transmission system is inertia acquired by subtracting inertia of the engine from the sum of inertia (inertia forces) of rotation members making up the power transmission path rotating along with the engine between the engine and the drive wheels. Specifically, for example, the inertia of the power transmission system corresponds to the sum of inertia forces of the transmission, the differential gear device, the axles, etc.

Preferably, the clutch is a friction clutch that has a transmission torque capacity of the clutch gradually reduced as a clutch stroke increases and that is completely released when the clutch stroke exceeds a predetermined value. Since this causes the torque capacity of the clutch to gradually decrease in proportion to the clutch stroke, a load applied to the engine is gradually reduced as the clutch stroke increases and, when the clutch stroke exceeds a predetermined value, the clutch is completely released, interrupting the torque transmission between the engine and the power transmission system.

Preferably, the transmission is made up of a synchromesh manual transmission and the clutch has an engagement state adjusted depending on a change in clutch stroke based on a depressing operation of a clutch pedal by a driver.

MODE FOR CARRYING OUT THE INVENTION

An embodiment of the present invention will now be described in detail with reference to the drawings. The figures are simplified or deformed as needed in the following embodiment and portions are not necessarily precisely depicted in terms of dimension ratio, shape, etc.

Embodiment

Figure 1:
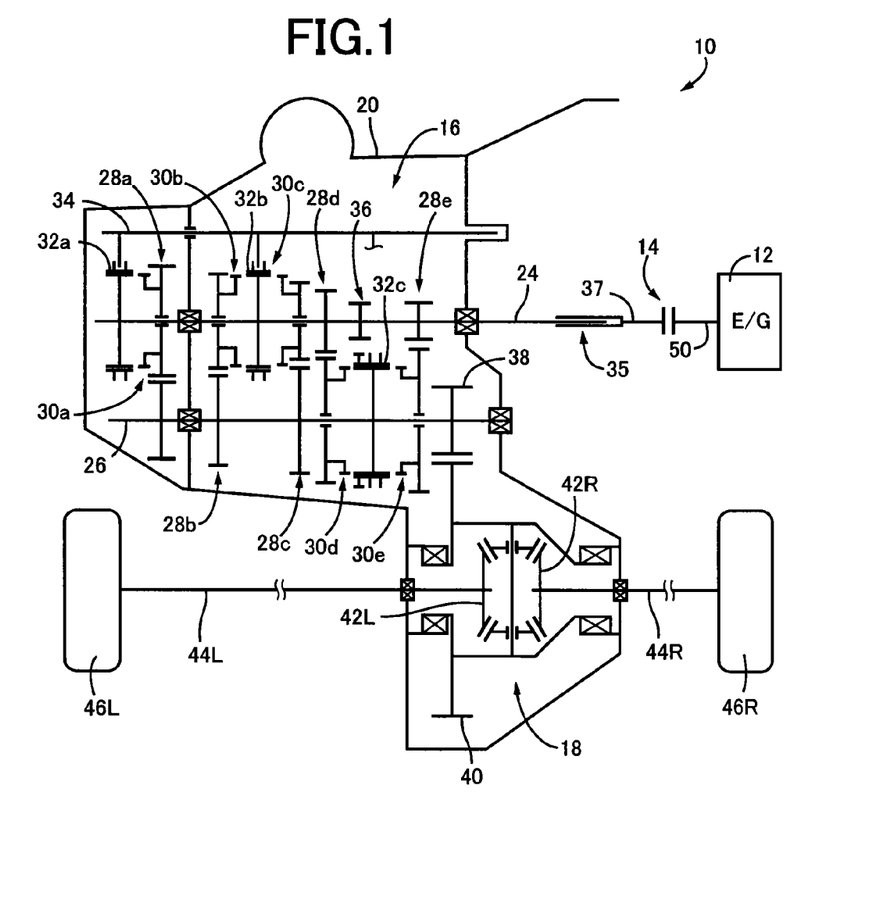
FIG. 1 is a schematic for explaining a general configuration of a vehicle drive device to which the present invention is applied.

FIG. 1 is a schematic for explaining a general configuration of a vehicle drive device 10 to which the present invention is applied, and the vehicle drive device 10 is a device for an FF (front-engine front-drive) vehicle and includes an engine 12 as a drive source for running, a clutch 14, a manual transmission 16, and a final reduction gear 18.

The manual transmission 16 is disposed along with the final reduction gear 18 in a common housing 20 to make up a transaxle and is immersed in lubricant oil infused into the housing 20 by a predetermined amount to be lubricated along with the final reduction gear 18. The manual transmission 16 includes a parallel-shaft-type constant-mesh shifting mechanism having a plurality of constant-mesh change gear pairs 28a to 28e having different gear ratios disposed between a pair of an input shaft 24 and an output shaft 26 in parallel with each other along with a plurality of jaw clutches 30a to 30e corresponding to the change gear pairs 28a to 28e, and a shift select shaft 34 switching gear stages by selectively moving any of three clutch hub sleeves 32a, 32b, and 32c of the jaw clutches 30a to 30e, thereby establishing gear stages of five forward speeds. The input shaft 24 and the output shaft 26 are also disposed with a reverse gear pair 36 and a reverse gear stage is established by engagement with a reverse idle gear disposed on a counter shaft not depicted. The input shaft 24 is coupled to a clutch output shaft 37 of the clutch 14 by a spline portion 35 and the output shaft 26 is disposed with an output gear 38 and engaged with a ring gear 40 of the final reduction gear 18.

Each of the jaw clutches 30a to 30e is an constant-mesh type synchromesh clutch, and the shift select shaft 34 causes engagement of the jaw clutch 30e to establish a first gear stage having a largest gear ratio (rotation number of the input shaft 24/rotation number of the output shaft 26), engagement of the jaw clutch 30d to establish a second gear stage having a second largest gear ratio, engagement of the jaw clutch 30c to establish a third gear stage having a third largest gear ratio, engagement of the jaw clutch 30b to establish a fourth gear stage having a fourth largest gear ratio, and engagement of the jaw clutch 30a to establish a fifth gear stage having a smallest gear ratio.

The final reduction gear 18 is of a bevel-gear type and a pair of side gears 42R and 42L depicted in FIG. 1 is coupled by spline fitting etc., to drive shafts 44R and 44L, respectively, to rotationally drive left and right front wheels (drive wheels) 46R and 46L.

Figure 2:
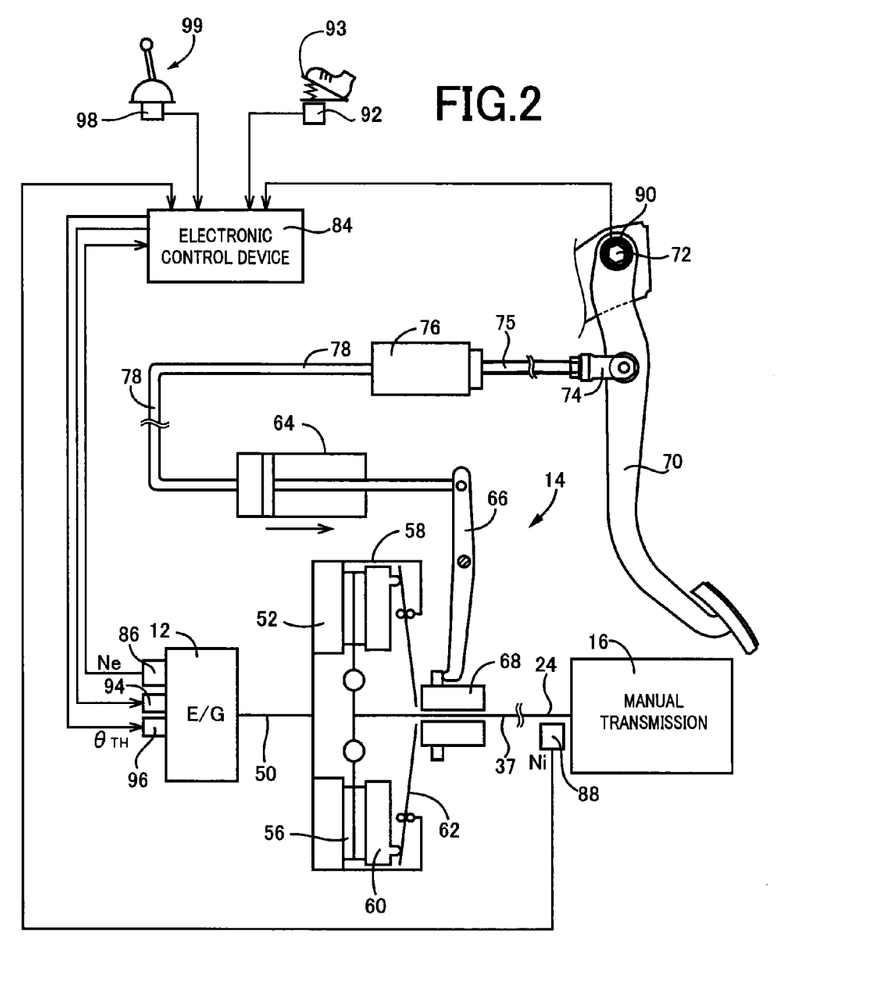
FIG. 2 is a diagram schematically depicting a general structure of the clutch of FIG. 1 and a mechanism for engaging and releasing the clutch in accordance with a clutch pedal operation of a driver.

FIG. 2 schematically depicts a general structure of the clutch 14 interposed between the engine 12 and a power transmission system of FIG. 1 and a mechanism for engaging and releasing the clutch 14 in accordance with a clutch pedal operation of a driver. The clutch 14 has a flywheel 52 attached to a crankshaft 50 acting as an output shaft of the engine 12; a clutch disc 56 disposed on a clutch output shaft 37; a pressure plate 60 disposed on a clutch housing 58; a diaphragm spring 62 biasing the pressure plate 60 toward the flywheel 52 to clamp the clutch disc 56 for transmitting power; a clutch release cylinder 64 acting as a clutch actuator; a release sleeve 68 moved via a release fork 66 by the clutch release cylinder 64 toward the flywheel 52 (to the left side of FIG. 2) so as to displace an inner end portion of the diaphragm spring 62 toward the flywheel 52 (to the left side of FIG. 2) to release (interrupt) the clutch 14.

When a driver depresses a clutch pedal 70, the clutch pedal 70 is rotated around a supporting portion 72 to move a pushrod 75 via a clevis 74 in an axial direction and operating oil in a clutch master cylinder 76 is supplied through a pipe 78 to the clutch release cylinder 64. The operating oil moves a piston in the clutch release cylinder 64 and causes the release sleeve 68 via the release fork 66 to push the diaphragm spring 62, thereby releasing the clutch 14. When the depression of the clutch pedal 70 is canceled, the operating oil moves toward the clutch master cylinder 76. To the supporting portion 72, a clutch stroke sensor 90 is attached for detecting a clutch stroke CS that is an operation amount of the clutch pedal 70.

An electronic control device 84 includes a microcomputer and executes signal processes in accordance with programs stored in advance in a ROM, while utilizing a temporary storage function of a RAM. The electronic control device 84 is supplied with a signal indicative of an engine rotation speed Ne from an engine rotation speed sensor 86, a signal indicative of a rotation speed (input shaft rotation speed Ni) of the input shaft 24 of the manual transmission 16 from an input shaft rotation speed sensor 88, a signal indicative of the clutch stroke CS corresponding to an operation amount of the clutch pedal 70 from the clutch stroke sensor 90, a signal indicative of an accelerator opening degree Acc corresponding to an operation amount of an accelerator pedal 93 from an accelerator opening degree sensor 92, and a signal indicative of a lever position SS from a lever position sensor 98. The electronic control device 84 is also supplied with a signal indicative of a vehicle speed V from a vehicle speed sensor not depicted, a signal indicative of a throttle valve opening degree $\theta_{TH}$ from a throttle valve opening degree sensor, a signal indicative of an intake air amount Q from an intake air amount sensor, a signal indicative of an engine water temperature from an engine cooling water temperature sensor, a signal indicative of ON/OFF of a foot brake from a brake switch, etc.

In accordance with the signals, the electronic control device 84 controls a fuel injection amount and injection timing of a fuel injection valve 94, controls ignition timing of an ignition plug with an igniter not depicted, and provides opening/closing control of the throttle valve opening degree $\theta_{TH}$ of an electronic throttle valve 96 with a throttle actuator such as an electric motor, thereby controlling an output state of the engine 12.

Figure 3:
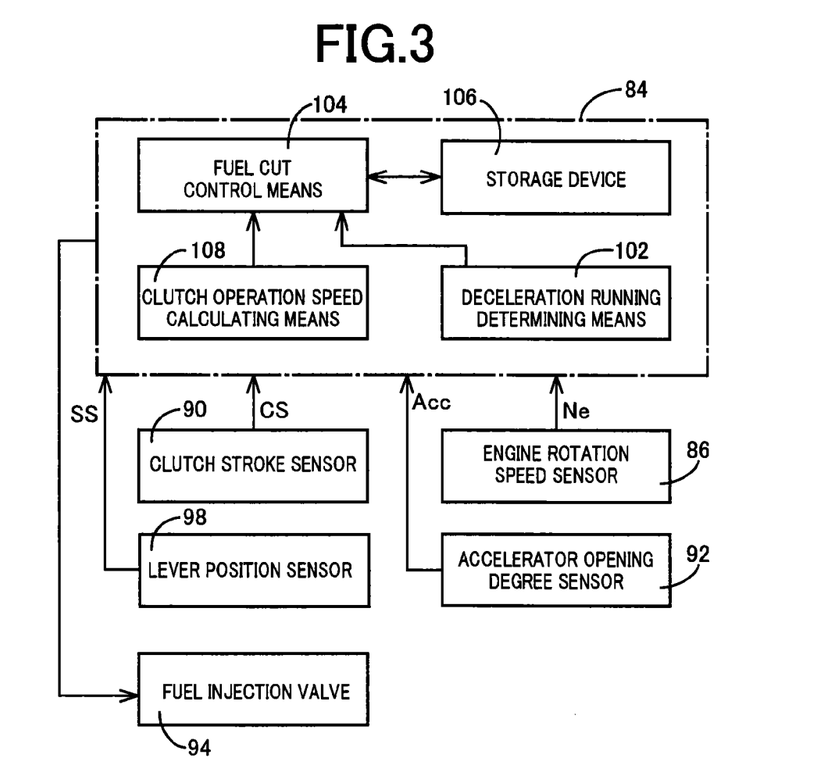
FIG. 3 is a function block diagram for explaining a main portion of control operation of the electronic control device of FIG. 2.

FIG. 3 is a function block diagram for explaining a main portion of control operation of the electronic control device 84. In FIG. 3, each means surrounded by a dashed-dotted line indicates a portion of the function of the electronic control device 84.

A deceleration running determining means 102 depicted in FIG. 3 determines whether a vehicle is in a deceleration running state. The deceleration running determining means 102 determines the deceleration running of a vehicle based on whether the accelerator opening degree Acc corresponding to a depressed amount of the accelerator pedal 93 is zero, i.e., the depression of the accelerator pedal is canceled, for example.

A fuel cut control means 104 stops fuel injection to the engine 12 when the deceleration running determining means 102 determines that a vehicle is in the deceleration running state and the engine rotation speed Ne at the moment is equal to or greater than a preset fuel cut recovery rotation speed Nercv (fuel cut recovery rotation speed). Specifically, the fuel injection valve 94 is temporarily closed to stop the fuel injection. The execution of the fuel cut control means 104 reduces fuel consumption and therefore improves fuel efficiency. When the engine rotation speed Ne is lowered to the fuel cut recovery rotation speed Nercv, the fuel cut control means 104 resumes the fuel injection through the fuel injection valve 94 to recover the engine 12. The recovery of the engine 12 corresponds to a state in which injection of fuel causes combustion of the fuel injected into cylinders of the engine 12 and brings the engine 12 into operation again. The conditions, i.e., a vehicle in the deceleration running state and the engine rotation speed Ne equal to or greater than the fuel cut recovery rotation speed Nercv, correspond to a predetermined fuel cut condition of the present invention.

The fuel cut recovery rotation speed Nercv is obtained in advance from an experiment or a calculation. The fuel cut recovery rotation speed Nercv is conventionally set based on an engaged state of the clutch 14 capable of interrupting a power transmission path between the engine 12 and the power transmission system. In the engaged state of the clutch 14 capable of interrupting the power transmission path between the engine 12 and the power transmission system, all inertia (inertia force) of the power transmission system acts on the engine 12 and, therefore, the fuel cut recovery rotation speed Nercv is set to a rotation speed with consideration given to the inertia. Specifically, a rotation speed is obtained that enables the recovery of the engine 12 with the inertia of the power transmission system applied to the engine 12, from an experiment etc.

The inertia of the power transmission system corresponds to the sum of inertia (inertia forces) of rotating members making up the power transmission path from the clutch 14 to the drive wheels 46 and specifically is the sum of inertia including inertia of the manual transmission 16, the final reduction gear 18, and the drive shafts 44 rotating with the engine 12. If the inertia of the power transmission system acts on the engine 12, when the engine rotation speed Ne is increased at the time of engine recovery, this inertia gives the effect of suppressing a change in the engine rotation speed Ne and therefore acts as a load (resistance) when the rotation speed Ne of the engine 12 is increased.

For example, while the clutch 14 is engaged, all of the inertia of the power transmission system acts via the clutch 14 on the rotation of the crankshaft 50 of the engine 12, resulting in the largest rate of inertia of the power transmission system acting on the rotation of the crankshaft 50 of the engine 12. On the other hand, while the clutch is released, the clutch 14 interrupts the power transmission path between the engine 12 and the power transmission system, resulting in a smaller rate of inertia of the power transmission system acting on the rotation of the crankshaft 50 of the engine 12 (specifically, the rate becomes zero). If the clutch stroke CS increases, the clutch 14 gradually turns to a slip engagement state (partially engaged) and the transmission torque capacity of the clutch 14 gradually decreases as the clutch stroke CS increases. Therefore, as the clutch stroke CS increases, the inertia of the power transmission system has a smaller rate of inertia of the power transmission system acting on the rotation of the crankshaft 50 of the engine 12. Even when the clutch 14 is engaged, if the manual transmission 16 is in a neutral state, the power transmission path is interrupted in the manual transmission 16, resulting in a smaller rate of inertia of the power transmission system acting on the rotation of the crankshaft 50 of the engine 12. On the other hand, while the clutch 14 is engaged and a predetermined gear stage is formed (gear-stage forming state) in the manual transmission 16, the power transmission path is formed between the engine 12 and the drive wheels 46, resulting in a larger rate of inertia of the power transmission system acting on the rotation of the crankshaft 50 of the engine 12.

In the case of a larger rate of inertia of the power transmission system acting on the rotation of the crankshaft 50 of the engine 12, if the fuel cut recovery rotation speed Nercv at the time of recovery of the engine 12 is set to a low rotation speed, the start of fuel injection to the engine 12 does not bring the engine 12 into operation and the recovery becomes difficult. Therefore, in the case of a larger rate of inertia of the power transmission system acting on the rotation of the crankshaft 50 of the engine 12, the fuel cut recovery rotation speed Nercv is defined as a higher value as compared to the case of a smaller rate of inertia of the power transmission system acting on the rotation of the crankshaft 50 of the engine 12. Since the fuel cut recovery rotation speed Nercv is conventionally set based on the case of a larger rate of inertia of the power transmission system acting on the engine 12, i.e., the completely engaged state of the clutch 14 as mentioned above, the fuel cut recovery rotation speed Nercv is set to a higher value.

However, while the clutch 14 is released and the power transmission path between the engine 12 and the power transmission system is interrupted, since the inertia of the power transmission system does not act on the engine 12, i.e., a rate of inertia of the power transmission system acting on the rotation of the crankshaft 50 of the engine 12 is smaller, a load applied to the engine 12 is reduced at the time of recovery of the engine 12 as compared to when the clutch is engaged. Therefore, when the clutch is released, even if the fuel cut recovery rotation speed Nercv is set to a lower rotation speed as compared to when the clutch is engaged, a smaller load applied to the engine 12 enables the recovery of the engine 12. When the clutch 14 is in a partially engaged state, the load applied to the engine 12 is also reduced as compared to when the clutch 14 is engaged (completely engaged) and, therefore, even if the fuel cut recovery rotation speed Nercv is set to a lower rotation speed as compared to when the clutch is engaged, the engine 12 can be recovered.

Thus, in this embodiment, when the inertia of the power transmission system has a smaller rate of inertia of the power transmission system acting on the rotation of the crankshaft 50 functioning as the output shaft of the engine 12, i.e., when a smaller load is applied to the engine 12, the fuel cut recovery rotation speed Nercv for starting fuel injection to the engine 12 is set to a lower rotation speed as compared to the case of a larger rate of inertia acting on the rotation of the crankshaft 50 of the engine 12 so as to expand a range of the engine rotation speed Ne for executing fuel cut, thereby improving fuel efficiency.

Since a rate of inertia of the power transmission system acting on the rotation of the crankshaft 50 of the engine 12 varies depending on an engagement state of the clutch 14, a degree of the inertia can be determined by detecting the engagement state of the clutch 14. The engagement state of the clutch 14, specifically, a state of the clutch 14 between the engaged state (complete engagement) and the released state, can be determined based on the clutch stroke CS that is an operation amount of the clutch pedal 70 detected by the clutch stroke sensor 90. This is because the clutch stroke CS and the engagement state of the clutch 14 are in the one-to-one relation and, therefore, the engagement state of the clutch 14 can be determined by detecting the clutch stroke CS.

For example, while the clutch stroke CS is zero, i.e., while the clutch pedal 70 is not depressed at all, the clutch 14 is in the engaged (completely engaged) state, resulting in a larger rate of inertia of the power transmission system acting on the rotation of the crankshaft 50 of the engine 12. If the clutch pedal 70 is depressed, no change is made in the engagement of the clutch 14 until a predetermined clutch stroke CS because a clearance of the clutch 14 is formed in advance; however when the clutch stroke CS exceeds a predetermined value CS1, the clutch 14 gradually starts slipping (being partially engaged) and, as the clutch stroke CS increases, the transmission torque capacity of the clutch 14 decreases, resulting in a reduced rate of inertia of the power transmission system acting on the rotation of the crankshaft 50 of the engine 12. When the clutch stroke CS further increases and the clutch stroke CS reaches a predetermined value CS2, the clutch 14 is completely released, resulting in the smallest rate of inertia of the power transmission system acting on the rotation of the crankshaft 50 of the engine 12.

The fuel cut recovery rotation speed Nercv enabling the recovery of the engine 12 is obtained in advance by an experiment or a calculation depending on a value of the clutch stroke CS, i.e., the engagement state of the clutch 14 and a rate of inertia of the power transmission system acting on the rotation of the crankshaft 50 of the engine 12, and the obtained fuel cut recovery rotation speed Nercv is stored in a storage means 106 depicted in FIG. 3.

The fuel cut recovery rotation speed Nercv is obtained not only as the fuel cut recovery rotation speed Nercv corresponding to the clutch stroke CS but also as a value corresponding to a change rate of the clutch stroke CS, i.e., a clutch operation speed CS' in advance by an experiment or a calculation and stored in the storage means 106. When the clutch operation speed CS' is larger, even if the clutch stroke CS is the same value, the clutch 14 is predicted to be promptly released. Therefore, as the clutch operation speed CS' becomes higher, the fuel cut recovery rotation speed Nercv is set to a lower value based on the prediction of release of the clutch 14. The clutch operation speed CS' is obtained by a clutch operation speed calculating means 108 depicted in FIG. 3. The clutch operation speed calculating means 108 temporally differentiates the clutch stroke CS sequentially detected by the clutch stroke sensor 90 to obtain the clutch operation speed CS' at the moment.

Figure 4:
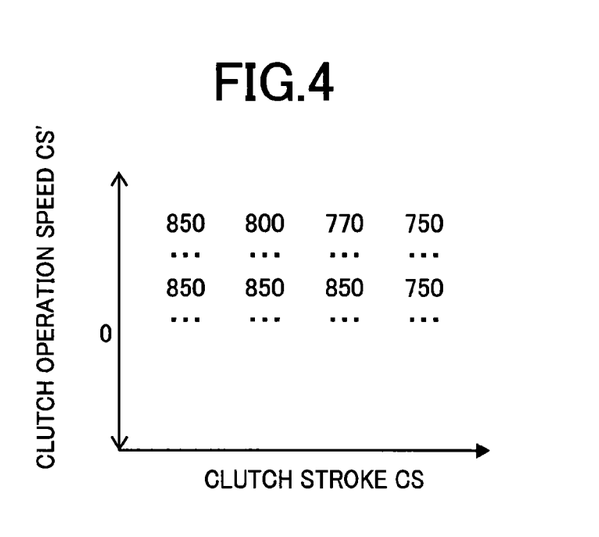
FIG. 4 depicts an example of a two-dimensional table indicative of the fuel cut recovery rotation speed to the clutch stroke and the clutch operation speed stored in advance in the electronic control device of FIG. 3.

FIG. 4 depicts an example of a two-dimensional table indicative of the fuel cut recovery rotation speed Nercv (rpm) to the clutch stroke CS and the clutch operation speed CS' stored in advance in the storage means 106. For example, the fuel cut recovery rotation speed Nercv is prescribed by the two-dimensional table based on the clutch stroke CS and the clutch operation speed CS' as depicted in FIG. 4.

As depicted in FIG. 4, as the clutch stroke CS increases, the fuel cut recovery rotation speed Nercv decreases. This is because an increase in the clutch stroke CS reduces a rate of inertia of the power transmission system acting via the clutch 14 on the rotation of the crankshaft 50 of the engine 12 as described above. As the clutch operation speed CS' increases, the fuel cut recovery rotation speed Nercv decreases. This is because when the clutch operation speed CS' becomes larger, a prompt release of the clutch 14 is predicted as described above.

The fuel cut recovery rotation speed Nercv is determined based on the current clutch stroke CS and clutch operation speed CS' from this two-dimensional table. Specifically, the fuel cut recovery rotation speed Nercv corresponding to the current clutch stroke CS and clutch operation speed CS' is obtained based on the two-dimensional table by an interpolation technique etc.

Figure 5:
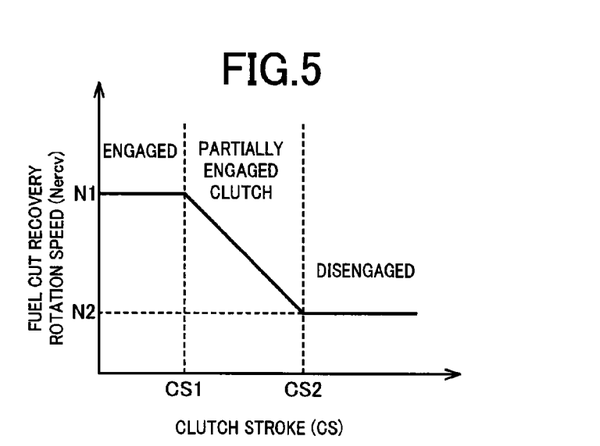
FIG. 5 is a diagram depicting an inclination of the fuel cut recovery rotation speed relative to the clutch stroke in the two-dimensional table of FIG. 4.

The fuel cut control means 104 sequentially refers to the fuel cut recovery rotation speed Nercv stored in the storage means 106 to provide fuel cut control. FIG. 5 depicts an inclination of the fuel cut recovery rotation speed Nercv relative to the clutch stroke CS in the two-dimensional table of FIG. 4. As depicted in FIG. 5, after the clutch pedal is depressed until the clutch stroke CS reaches the clutch stroke CS1, no slip occurs in the clutch 14 due to the clearance formed in advance in the clutch pedal 70 and, therefore, the fuel cut recovery rotation speed Nercv is set to a highest value N1 during engagement of the clutch.

When the clutch stroke CS reaches the clutch stroke CS1 causing the clutch 14 to start slipping, the fuel cut recovery rotation speed Nercv is progressively reduced. When the clutch stroke CS exceeds the clutch stroke CS1, since the transmission torque capacity of the clutch 14 is progressively reduced as the clutch stroke CS increases, a rate of inertia of the power transmission system acting on the rotation of the crankshaft 50 of the engine 12 is also progressively reduced. Therefore, the fuel cut recovery rotation speed Nercv is set to a lower value as the clutch stroke CS increases.

When the clutch stroke CS reaches the clutch stroke CS2 completely releasing the clutch 14, the fuel cut recovery rotation speed Nercv becomes constant at a lowest value N2. When the clutch stroke CS reaches the clutch stroke CS2, the complete release of the clutch 14 cuts the power transmission path between the engine 12 and the power transmission system, resulting in the smallest rate of inertia of the power transmission system acting on the rotation of the crankshaft 50 of the engine 12. Thus, even if the fuel cut recovery rotation speed Nercv is set to the lower value N2, a smaller rotation resistance (load) at the start of the engine 12 enables the recovery of the engine 12.

Returning to FIG. 3, the fuel cut control means 104 sets the fuel cut recovery rotation speed Nercv to the rotation speed N2 if the manual transmission 16 is in the neutral state regardless of a value of the clutch stroke CS. This is because when the manual transmission 16 is in the neutral state, the power transmission path between the engine 12 and the drive wheels 46 is interrupted, resulting in a smaller rate of inertia of the power transmission system acting on the rotation of the crankshaft 50 of the engine 12. Whether the manual transmission 16 is in the neutral state is determined based on a signal indicative of the lever position SS from the lever position sensor 98 disposed on a shift operation device 99.

Figure 6:
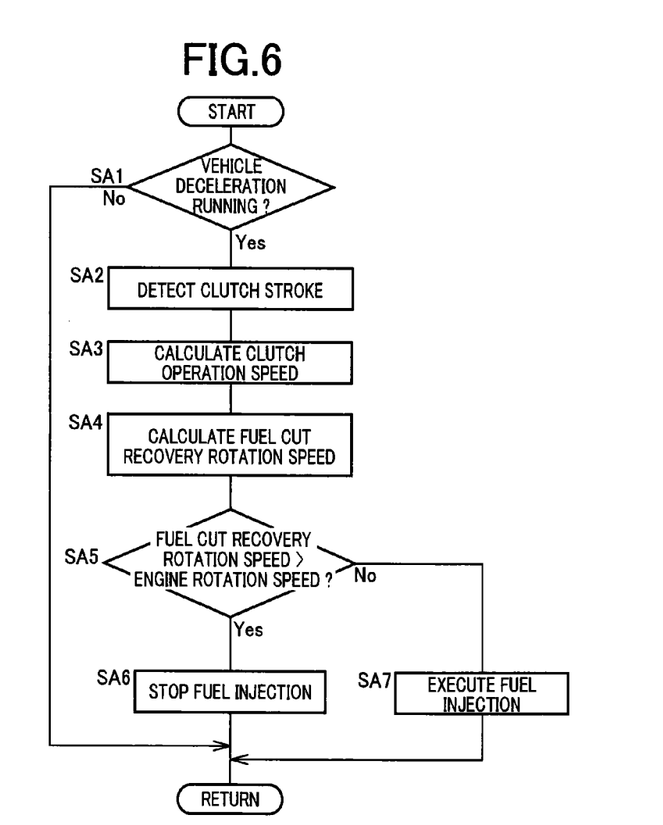
FIG. 6 is a flowchart for explaining a portion of the control operation of the electronic control device of FIG. 3, i.e., a control operation of sequentially setting an optimum value of the fuel cut recovery rotation speed for performing fuel injection to recover the engine from the fuel cut control during vehicle deceleration running.

FIG. 6 is a flowchart for explaining a portion of the control operation of the electronic control device 84, i.e., a control operation of sequentially setting an optimum value of the fuel cut recovery rotation speed Nercv for performing fuel injection to recover the engine 12 from the fuel cut control during vehicle deceleration running and is repeatedly executed with an extremely short cycle time, for example, on the order of few msec to a few tens of msec.

First, at step SA1 (hereinafter, step will be omitted) corresponding to the deceleration running determining means 102, it is determined whether a vehicle is in a deceleration running state. The deceleration running state of a vehicle is determined based on whether the current accelerator opening degree Acc is zero, for example. If the determination is negative at SA1, this routine is terminated. On the other hand, if the determination is affirmative at SA1, the clutch stroke CS is detected at SA2 corresponding to the fuel cut control means 104. At SA3 corresponding to the clutch operation speed calculating means 108, the sequentially detected clutch stroke CS is temporally differentiated to obtain the clutch operation speed CS'.

At SA4 corresponding to the fuel cut control means 104 and the storage means 106, the fuel cut recovery rotation speed Nercv at the present moment is calculated based on the two-dimensional table of the fuel cut recovery rotation speed Nercv defined by the clutch stroke CS and the clutch operation speed CS' depicted in FIG. 4 and the actual clutch stroke CS and clutch operation speed CS' at the present moment obtained at SA2 and SA3. At SA5 corresponding to the fuel cut control means 104, it is determined whether the fuel cut recovery rotation speed Nercv calculated at SA4 is greater than the current engine rotation speed Ne. If the determination is affirmative at SA5, the fuel injection valve 94 is closed to stop fuel injection (fuel cut) at SA6 corresponding to the fuel cut control means 104. On the other hand, if the determination is negative at SA5, fuel injection is executed. As depicted in the flowchart of FIG. 6, at steps SA2 to SA4, the optimum fuel cut recovery rotation speed Nercv at the moment is sequentially calculated and the execution or termination of fuel injection is sequentially determined based on the calculated fuel cut recovery rotation speed Nercv. The fuel cut recovery rotation speed Nercv is a value corresponding to a value of the clutch stroke CS, in other words, a rate of inertia of the power transmission system acting on the rotation of the crankshaft 50 of the engine 12, i.e., an engagement state of the clutch 14, and, therefore, the fuel cut recovery rotation speed Nercv is set to a lower rotation speed as compared to the case of setting the fuel cut recovery rotation speed Nercv based on the completely engaged state of the clutch 14. Therefore, since the rotation range of execution of fuel cut is expanded, a time of execution of fuel cut is increased and fuel efficiency is improved.

Figure 7:
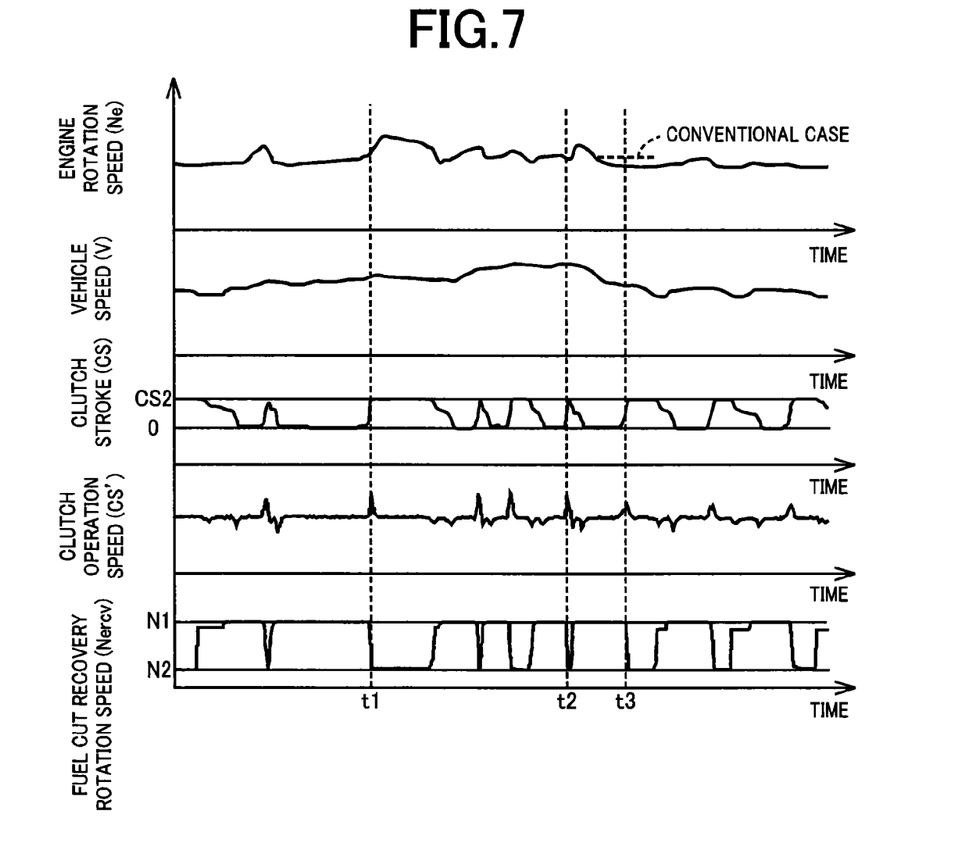
FIG. 7 is a time chart for explaining effect of control operation implemented by performing the control operation based on the flowchart of FIG. 6.

FIG. 7 is a time chart for explaining effect of control operation implemented by performing the control operation based on the flowchart of FIG. 6. FIG. 7 depicts actual device data of empirically detected vehicle states in a vehicle to which this control is applied. In FIG. 7, the horizontal axis indicates time and the vertical axis indicates the engine rotation speed Ne, the vehicle speed V, the clutch stroke CS, the clutch operation speed CS', and the fuel cut recovery rotation speed Nercv in the order from the top. As the clutch stroke CS increases, the clutch 14 is gradually released and, at the clutch stroke CS2, the clutch 14 turns to a completely released state.

As depicted in FIG. 7, for example, at time t1, when the clutch pedal 70 is depressed and the clutch stroke CS increases, the fuel cut recovery rotation speed Nercv correspondingly decreases. While the depressed state of the clutch pedal 70 is maintained, the fuel cut recovery rotation speed Nercv is maintained at the lower rotation speed N2. In this case, although the engine rotation speed Ne is immediately increased because the power transmission path between the engine 12 and the power transmission system is interrupted, the engine rotation speed Ne is gradually reduced due to the execution of fuel cut.

For example, at time t2, when the clutch pedal 70 is depressed and the clutch stroke CS reaches the clutch stroke CS2, the fuel cut recovery rotation speed Nercv correspondingly decreases to the rotation speed N2. In this case, although the engine rotation speed Ne is increased because the power transmission path between the engine 12 and the power transmission system is interrupted, the engine rotation speed Ne is gradually reduced due to the execution of fuel cut. The vehicle speed V is also gradually reduced due to the execution of fuel cut. After a predetermined time has elapsed from time t2, the cancelation of the depression of the clutch pedal 70 returns the fuel cut recovery rotation speed Nercv to the rotation speed N1 and, since the engine rotation speed Ne is a rotation speed higher than the rotation speed N1, the fuel cut is continuously executed and the engine rotation speed Ne and the vehicle speed V decrease. At time t3, when the clutch pedal 70 is depressed again and the clutch stroke CS reaches the clutch stroke CS2, the fuel cut recovery rotation speed Nercv correspondingly decreases to the rotation speed N2. As a result, while the depression of the clutch pedal 70 is maintained from time t3, the engine rotation speed Ne is reduced to rotation speed N2 and the range of execution of fuel cut is expanded. In the conventional case, since the fuel injection of the engine 12 is started when the engine rotation speed Ne is reduced to the rotation speed N1, the engine rotation speed Ne is maintained higher as indicated by a broken line, for example, and the fuel efficiency deteriorates.

As described above, according to this embodiment, in the case of a smaller rate of inertia of the power transmission system acting on the rotation of the crankshaft 50 that is the output shaft of the engine 12, fuel injection is started at a lower fuel cut recovery rotation speed Nercv as compared to the case of a larger rate of inertia of the power transmission system acting on the rotation of the crankshaft 50 of the engine 12. In the case of a smaller rate of inertia of the power transmission system acting on the rotation of the crankshaft 50 of the engine 12, a load acting on the engine 12 is smaller as compared to the case of a larger rate of inertia of the power transmission system and, therefore, the engine can be started, i.e., operation of the engine can be recovered, even if fuel injection is started at a lower rotation speed as compared to the case of a larger rate of inertia. Therefore, in the case of a smaller rate of inertia of the power transmission system acting on the rotation of the crankshaft 50 of the engine 12, even if fuel injection is started at a lower rotation speed as compared to the case of a larger rate of inertia of the power transmission system, startability of the engine 12 is ensured and, since a time of stopping fuel injection is extended, fuel efficiency can be improved.

According to this embodiment, in the case of a smaller rate of inertia of the power transmission system acting on the rotation of the crankshaft 50 of the engine 12, i.e., during release of the clutch 14, fuel injection is started at a lower fuel cut recovery rotation speed Nercv as compared to during engagement of the clutch 14 causing a larger rate of inertia of the power transmission system acting on the rotation of the crankshaft 50 of the engine 12. During release of the clutch 14, the power transmission between the engine 12 and the power transmission system is interrupted and a load applied to the engine 12 is reduced and, therefore, even if fuel injection is started from a state of a lower rotation speed of the engine 12 as compared to during engagement of the clutch, operation of the engine can be recovered and the startability of the engine 12 is ensured. Therefore, during release of the clutch 14 causing a smaller rate of inertia of the power transmission system acting on the rotation of the crankshaft 50 of the engine 12, even if fuel injection is started at a lower rotation speed as compared to during engagement of the clutch 14, the startability of the engine 12 is ensured and, since a time of stopping fuel injection is extended, fuel efficiency can be improved.

According to this embodiment, when the clutch 14 is engaged and the manual transmission 16 is in the neutral state, the power transmission path is interrupted by the manual transmission 16 despite the engagement of the clutch 14 and, therefore, a load applied to the engine 12 is reduced in accordance with a reduction in rate of inertia of the power transmission system acting on the rotation of the crankshaft 50 of the engine 12. On the other hand, when the manual transmission 16 is in a gear-stage forming state, the power transmission path is formed between the engine 12 and the drive wheels 46 and, therefore, a load applied to the engine 12 is increased in accordance with an increase in rate of inertia of the power transmission system acting on the rotation of the crankshaft 50 of the engine 12. When the manual transmission 16 is in the neutral state, since a load applied to the engine 12 is reduced in accordance with a reduction in rate of inertia of the power transmission system acting on the rotation of the crankshaft 50 of the engine 12, even if fuel injection is started from a state of a lower rotation speed of the engine 12, the operation of the engine 12 can be recovered and the startability of the engine is ensured. Therefore, when the manual transmission 16 is in the neutral state, even if fuel injection is started at a lower rotation speed as compared to when a gear stage is formed, the startability of the engine 12 is ensured and, since a time of stopping fuel injection is extended, fuel efficiency can be improved.

According to this embodiment, an increase in the clutch stroke CS reduces a rate of inertia of the power transmission system acting on the rotation of the crankshaft 50 of the engine 12 and therefore reduces a load applied to the engine 12. Although an increase in the clutch stroke CS reduces the fuel cut recovery rotation speed Nercv for starting fuel injection, since a load applied to the engine 12 is also reduced, even if fuel injection is started from a state of a lower rotation speed of the engine 12, operation of the engine can be recovered and the engine startability is ensured. Therefore, even if the fuel cut recovery rotation speed Nercv for starting fuel injection is set to a lower value as the clutch stroke CS increases, the startability of the engine 12 is ensured and, since a time of stopping fuel injection is extended, fuel efficiency can be improved.

According to the embodiment, the fuel cut recovery rotation speed Nercv for starting fuel injection is set to a lower value as the clutch operation speed CS' becomes higher. As a result, for example, when the clutch operation speed CS' is larger, the clutch 14 is predicted to be promptly released and, therefore, even if the rotation speed for starting fuel injection of the engine 12 is lowered, the operation of the engine 12 can be recovered as the release of the clutch 14 reduces a load applied to the engine 12. Since a time of stopping fuel injection is extended, fuel efficiency can be improved.

According to the present embodiment, a rate of inertia of the power transmission system acting on the rotation of the crankshaft 50 of the engine 12 is determined based on the clutch stroke CS that is an operation amount of the clutch pedal 70. As a result, a degree of inertia of the power transmission system acting on the crankshaft 50 of the engine 12 can be determined by detecting the clutch stroke CS. Since the engagement state of the clutch 14 and the clutch stroke CS are in the one-to-one relation, a determination can be made on the engagement state of the clutch 14, i.e., a rate of inertia of the power transmission system acting on the rotation of the crankshaft 50 of the engine 12, based on the clutch stroke CS.

Although the embodiment of the present invention has been described in detail with reference to the drawings, the present invention is applied in other forms.

For example, although the present invention is applied to the manual transmission 16 having gear stages switched by manual operation of a driver in the embodiment, the present invention is not limited to the manual transmission 16 and is applicable to a vehicle of an AMT (Automatic Manual Transmission) type automatically switching the gear stages.

Although the present invention is applied to the clutch 14 disposed between the engine 12 and the manual transmission 16 in the embodiment, the present invention is not limited to the clutch 14 of the manual transmission 16 and is applicable to a lockup clutch included in a torque converter of an automatic transmission, for example.

Although the fuel cut recovery rotation speed Nercv is determined based on the clutch stroke CS and the clutch operation speed CS' in the embodiment, the fuel cut recovery rotation speed Nercv may be determined based only on the clutch stroke CS.

Although the fuel cut recovery rotation speed Nercv is set to decrease as the clutch stroke CS increases while the clutch 14 is slipping in the embodiment, the fuel cut recovery rotation speed Nercv same as during complete engagement of the clutch 14 may be set in a slip-engaged state, for example, and when the clutch 14 is completely released, the fuel cut recovery rotation speed Nercv may be reduced.

Although a degree of inertia of the power transmission system acting on the engine 12, i.e., an engagement state of the clutch 14 is determined based on the clutch stroke CS in the embodiment, the clutch stroke CS is not a limitation and, for example, a degree of inertia of the power transmission system may be determined by determining an engagement state of the clutch 14 from a rotation speed difference between the front and rear sides of the clutch 14, specifically, a rotation speed difference between the engine rotation speed Ne and the rotation speed (input shaft rotation speed N1) of the input shaft 24 of the manual transmission 16.

The described embodiment is merely an exemplary embodiment and the present invention may be implemented in variously modified and improved forms based on the knowledge of those skilled in the art.

Nomenclature of Elements

12: engine
14: clutch
50: crankshaft (output shaft of the engine)
70: clutch pedal
84: electronic control device (control device)

The invention claimed is:

1. A vehicle engine control device stopping fuel injection if a predetermined fuel cut condition is satisfied, during running with the fuel injection stopped, when inertia of a power transmission system rotating with the engine has a smaller rate of inertia of the power transmission system acting on rotation of an output shaft of the engine, the fuel injection being started at a lower engine rotation speed as compared to the case of a larger rate of inertia of the power transmission system acting on rotation of the output shaft of the engine, a clutch capable of connecting and interrupting power transmission between the engine and the power transmission system being interposed between the engine and the power transmission system, a rate of inertia of the power transmission system acting on rotation of the output shaft of the engine being configured to decrease as a clutch stroke of the clutch that is an operation amount of a clutch pedal increases, and an engine rotation speed for starting the fuel injection being set to a lower value as the clutch stroke increases.

2. The vehicle engine control device of claim 1, wherein the engine rotation speed for starting the fuel injection is set to a lower value as a clutch operation speed becomes higher.

* * * * *